UNITED STATES PATENT OFFICE.

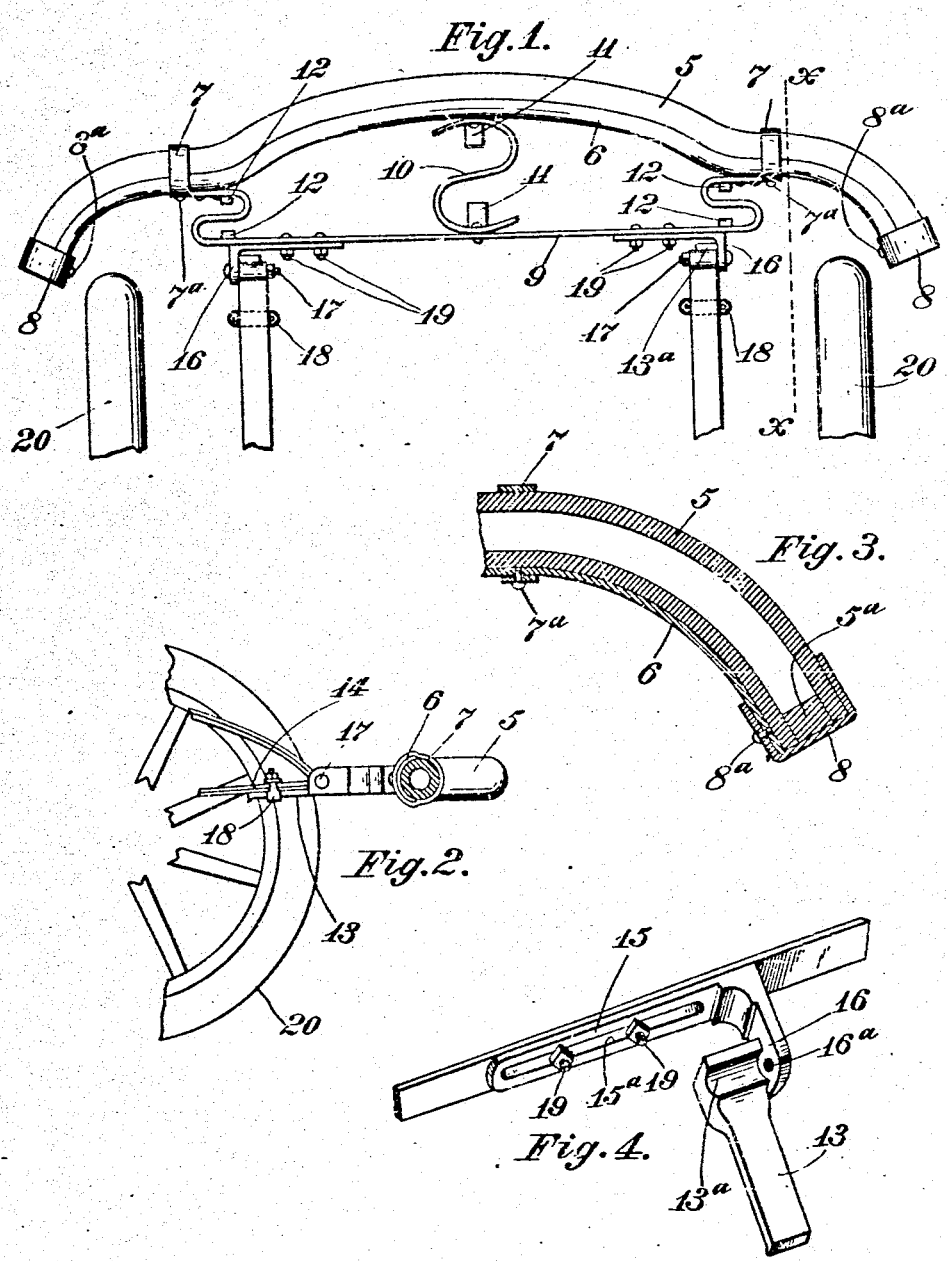

DANTE J. WELTON, OF COLUMBUS, OHIO.

FENDER FOR AUTOMOBILES.

955,624.  Specification of Letters Patent.  Patented Apr. 19, 1910.

Application filed December 8, 1909. Serial No. 531,822.

*To all whom it may concern:*

Be it known that I, DANTE J. WELTON, a citizen of the United States, residing at Columbus, in the county of Franklin and State of Ohio, have invented a certain new and useful Improvement in Fenders for Automobiles, of which the following is a specification.

The object of this invention is to provide an improved fender for vehicles, especially automobiles and the invention is embodied in the example of it shown in the accompanying drawing and described in the following description the features of novelty being pointed out in the claims appended to the description.

In the accompanying drawing—Figure 1 is a top plan of the fender showing parts of the front springs of an automobile and fractions of the front wheel. Fig. 2 is a vertical section and elevation on the line $x$—$x$ Fig. 1 looking to the left. Fig. 3 is a horizontal or longitudinal section of the end of the fender. Fig. 4 is a perspective view of the device for attaching the fender.

In the views the character 5 designates the impact member consisting of a tube of rubber and fabric the material of which is of such thickness and rigidity as not to require inflation to maintain it in distended form but of such flexibility as to permit it to yield when in forcible collision with other objects. This tube is plugged at its ends with rubber plugs $5^a$ and the tube is made of such length that it shall extend across the front of the vehicle and wheels and it is mounted upon a suitable curved seat 6 of metal, wood, or other rigid material. The tube can be if desired, connected or otherwise secured to the seat 6 but it is preferred to employ metal rings 7 closely encircling both the tube and the seat, the ring being secured to the seat near its ends by screws $7^a$, and at its ends metal caps 8 covering both the tube end and the seat end, the cap being secured to the seat by screws $8^a$. The tube and its seat are mounted on a metallic supporting bar 9 having its ends bent to S- and reversed S-form constituting springs, the seat 6 being bolted or riveted to the free terminal portions of said springs. Between the middle of the bar 9 and the middle of the seat 6 is secured by bolts or rivets another spring 10 of metal bent to S-form as viewed from the under side. 11, 11, are rubber blocks to cushion the parts of the spring 10 against a too violent compression and 12, 12, are similar rubber blocks on each of the two springs of the supporting bar 9.

As automobiles vary in width I provide means for adapting the fender to any width commonly employed. This means consists of a pair of brackets each having a shank portion 13 with a rounded seat $13^a$ that fits under the forward end of one of the forward springs 14 of the automobile and an inwardly standing head portion 15 provided with a slot $15^a$. The head portion is integral with the shank portion and has a shoulder 16 at the outer end of the rounded seat $13^a$ provided with a bolt hole $16^a$. Ordinarily the leaves of a spring 14 are hinged or held together at their ends by a nutted bolt. I propose to utilize such a nutted bolt except that it should be longer than usual, as seen at 17, to subserve the double function of aiding in securing the bracket to the spring and of holding the parts of the spring together said bolt being passed through hole $16^a$ and the usual opening at the junction of the parts of the spring. The rear end of the shank of each bracket is secured to the lower leaf of the spring 14 by means of an ordinary clip 18.

The fender proper with its described equipment is secured to each of the two brackets by means of two nutted bolts 19, 19, the bolts being passed through round holes in the bar 9 and the slots $15^a$ of the brackets.

20, 20, designate the forward wheels of the automobile.

With this construction it will be observed that among other advantages the resilience of the tube is supplemented by the resilience of the springs behind it and that upon collision danger of injury to persons or the vehicle is greatly lessened.

What I claim is:

1. In a fender, the combination of a resilient impact member, a seat for the same, and the supporting bar 9 having its ends bent to form S-shaped springs and means for connecting said seat with said springs, substantially as described.

2. In a fender, the combination of a resilient impact member, a seat for the same, the supporting bar 9 having its ends provided with springs, means for connecting said seat with said springs and an S-shaped spring located between the aforesaid springs and means for connecting the same with said bar and seat, substantially as described.

3. In a fender, the combination of a resilient impact member, a seat for the same, the supporting bar 9 having its ends provided with springs, means for connecting said seat with said springs, an S-shaped spring located between the aforesaid springs and means for connecting the same with said bar and seat, and cushions for the parts of said last named spring, substantially as described.

4. In a vehicle fender, the combination with an impact member and supporting frame therefor, of brackets for securing the same to the forward springs of a vehicle each consisting of a slotted head portion 15 having a shank 13 provided with a seat to fit against the spring and means for securing the bracket to the supporting frame and spring, substantially as described.

5. In a vehicle fender, the combination with an impact member and supporting frame therefor, of brackets for securing the same to the forward springs of a vehicle each consisting of a slotted head portion 15 having a shank 13 provided with a seat to fit against the spring and with a perforated shoulder 16, and means for securing the bracket to the supporting frame and spring, substantially as described.

6. In a vehicle fender, the combination with an impact member and supporting frame therefor, of a bracket for securing the same to the forward spring of a vehicle consisting of a head portion to which the frame of the fender is attached, said head portion having a shank provided with a seat to fit against the face of the end of the spring and a shoulder to fit against the side of the end of the spring, means for securing the supporting frame to the bracket, and means for securing the bracket to the spring, substantially as described.

7. In a vehicle fender, the combination with an impact member and supporting frame therefor, of brackets for securing the same to the forward springs of a vehicle each consisting of a slotted head portion 15 having a shank 13 provided with a seat to fit against the spring and with a perforated shoulder 16, means for securing the bracket to the supporting frame and a bolt for securing the bracket to the spring, said bolt being also adapted to secure the parts of the spring together, substantially as described.

8. In a vehicle fender, the combination with a suitable seat, of a resilient tube seated in said seat, said tube having a plug in its end to hold said end distended, said tube being normally distended without inflation and a metallic cap inclosing said plug and end, and means for securing the cap to said seat, substantially as described.

DANTE J. WELTC

Witnesses:
BENJAMIN FINCKEL,
MAYME FOARD.